(12) United States Patent
Clontz et al.

(10) Patent No.: US 11,678,605 B2
(45) Date of Patent: Jun. 20, 2023

(54) MOWER DECK LEVELING LINKAGE

(71) Applicant: DEERE & COMPANY, Moline, IL (US)

(72) Inventors: Wesley E. Clontz, Willow Springs, NC (US); Chad L. Helland, Knoxville, TN (US); Scott M. Johanek, Shawano, WI (US)

(73) Assignee: DEERE & COMPANY, Moline, IL (US)

( * ) Notice: Subject to any disclaimer, the term of this patent is extended or adjusted under 35 U.S.C. 154(b) by 403 days.

(21) Appl. No.: 16/872,953

(22) Filed: May 12, 2020

(65) Prior Publication Data

US 2021/0352846 A1    Nov. 18, 2021

(51) Int. Cl.
  *A01D 34/74*     (2006.01)
  *A01D 67/00*     (2006.01)
  *A01D 34/66*     (2006.01)

(52) U.S. Cl.
  CPC .......... *A01D 34/74* (2013.01); *A01D 34/661* (2013.01); *A01D 67/005* (2013.01)

(58) Field of Classification Search
  CPC ..... A01D 34/74; A01D 34/661; A01D 67/005
  See application file for complete search history.

(56) References Cited

U.S. PATENT DOCUMENTS

| | | | |
|---|---|---|---|
| 2,915,318 A * | 12/1959 | Cecile | F16B 1/00 280/43 |
| 3,755,998 A * | 9/1973 | Hoffmeyer | A01D 34/74 280/43 |
| 3,874,150 A | 4/1975 | Boeck | |
| 4,496,005 A * | 1/1985 | Swartzendruber | A01B 15/00 172/395 |
| 4,737,067 A * | 4/1988 | Samejima | E02F 3/627 37/403 |
| 4,869,057 A | 9/1989 | Siegrist | |
| 5,025,617 A * | 6/1991 | Kuhn | A01B 59/044 56/DIG. 9 |
| 5,085,044 A * | 2/1992 | Freier, Jr. | A01D 34/685 56/16.9 |
| 5,956,932 A * | 9/1999 | Schmidt | A01D 34/64 56/15.8 |
| 5,970,690 A | 10/1999 | Toman | |
| 6,023,921 A * | 2/2000 | Burns | A01D 34/64 56/16.3 |
| 6,293,077 B1 * | 9/2001 | Plas | A01D 34/64 56/17.1 |
| 6,584,756 B2 * | 7/2003 | Buss | A01D 34/64 56/15.8 |
| 7,013,626 B1 * | 3/2006 | Strope | A01D 34/74 56/15.8 |
| 7,028,456 B2 * | 4/2006 | Thatcher | A01D 34/74 56/15.9 |

(Continued)

FOREIGN PATENT DOCUMENTS

| | | | | |
|---|---|---|---|---|
| EP | 696413 A1 * | 2/1996 | ............ | A01D 34/74 |
| EP | 1277384 A1 * | 1/2003 | ............ | A01D 34/64 |

(Continued)

*Primary Examiner* — Arpad F Kovacs

(57) ABSTRACT

A mower deck leveling linkage includes an eccentric leveling plate connecting between upper and lower linkages. The eccentric leveling plate pivots on an off-center axis to change the length of the linkage and level the mower deck.

3 Claims, 4 Drawing Sheets

(56) References Cited

U.S. PATENT DOCUMENTS

| | | | |
|---|---|---|---|
| 7,197,863 B1 | 4/2007 | Sugden | |
| 7,237,374 B2 * | 7/2007 | Sugden | A01D 43/00 56/249 |
| 7,587,886 B1 * | 9/2009 | Sugden | A01D 34/661 56/14.9 |
| 7,600,363 B2 * | 10/2009 | Porter | A01D 34/82 56/17.1 |
| 7,861,502 B1 | 1/2011 | Benway | |
| 8,544,249 B2 | 10/2013 | Goebert et al. | |
| 9,003,751 B2 | 4/2015 | Lancaster | |
| 2002/0059788 A1 * | 5/2002 | Velke | A01D 34/64 56/14.7 |
| 2006/0090442 A1 * | 5/2006 | Komiya | A01D 34/64 56/14.7 |
| 2019/0183043 A1 * | 6/2019 | Lapp | A01D 34/74 |
| 2019/0289783 A1 * | 9/2019 | Welz | A01D 34/661 |

FOREIGN PATENT DOCUMENTS

| | | | | |
|---|---|---|---|---|
| JP | 2011206018 A | * | 10/2011 | A01D 34/74 |
| WO | WO-9962320 A1 | * | 12/1999 | A01D 34/64 |

* cited by examiner

MOWER DECK LEVELING LINKAGE

FIELD OF THE INVENTION

This invention relates to mower decks on zero turn mowers, lawn and garden tractors and other vehicles, and specifically to a mower deck leveling linkage to level and align a mower deck.

BACKGROUND OF THE INVENTION

A mower deck may be suspended below a zero turn mower, lawn and garden tractor or other vehicle, or "floated" with gauge wheels attached to the mower deck. The mower deck may cover one or more rotary cutting blades. When a mower deck is suspended from a vehicle frame, the mower deck and blades should be in proper alignment relative to the mowing vehicle at all cutting heights. For example, the mower deck should be properly aligned so that each rotary cutting blade is level side-to-side and has a slight forward angle or "rake." Proper leveling and rake helps achieve better cut quality, prevents grass frazzling, provides better grass dispersal, better bagging results, and reduces the power required to run the engine. When leveled, the mower deck should be calibrated so that the blades are at the cutting height specified by the mower deck height control knob or lever.

To level a mower deck, adjustments may be made on the linkage between the mower deck and vehicle frame. For example, to level the mower deck side-to-side, the length of each linkage on the left or right side of the mower deck may be adjusted to raise or lower each side of the mower deck. Similarly, to properly align the mower deck front-to-rear, linkages between the front of the mower deck and vehicle frame may be used to lift or lower the front of the mower deck. Additionally, linkages may be adjusted so that the height of the cutting blades corresponds to the cutting height designated on the mower deck height control knob or lever. For example, a mower deck leveling linkage may include a double jam nut threaded on a straight, threaded wire form to raise and lower the deck. The measuring process may need to be repeated again to calibrate the deck height control knob or lever; i.e., to ensure that the final cutting height is the same as the height specified on the deck height control.

In the past, adjustment of mower deck leveling linkages required reaching around the mounting and drive components between the mower deck and fender deck. It is difficult for most operators to access the proper adjustment linkage and make adjustments using a wrench or similar tool. As a result, deck leveling is a task that is often neglected or performed inadequately, resulting in uneven cut quality. Improvements in deck leveling include U.S. Pat. No. 7,197,863 for Lawnmower cutter deck with side-to-side deck leveler assigned to Scag Power Equipment, Inc., which relates to a bell crank mechanism that adjusts the length of a chain between the deck and frame so the height of one side of the deck may be adjusted relative to the other; and U.S. Pat. No. 7,861,502 for Top adjusting linkage for leveling a mower deck assigned to Deere & Company, which describes a top adjusting linkage for leveling a mower deck that includes an access opening through which the operator can insert a tool to engage and turn the upper end of a lift rod. An improved mower deck leveling linkage is needed that is low cost and allows easy access for adjustment at each corner of the mower deck.

SUMMARY OF THE INVENTION

A mower deck leveling linkage includes an eccentric leveling plate engaged to a bracket on a corner or outer edge of a mower deck. A pin extends from an off-center position of the eccentric leveling plate and into a slot in the bracket. The eccentric leveling plate is pivotable on the axis of the pin to level the mower deck.

DESCRIPTION OF THE PREFERRED EMBODIMENT

Figure 1:
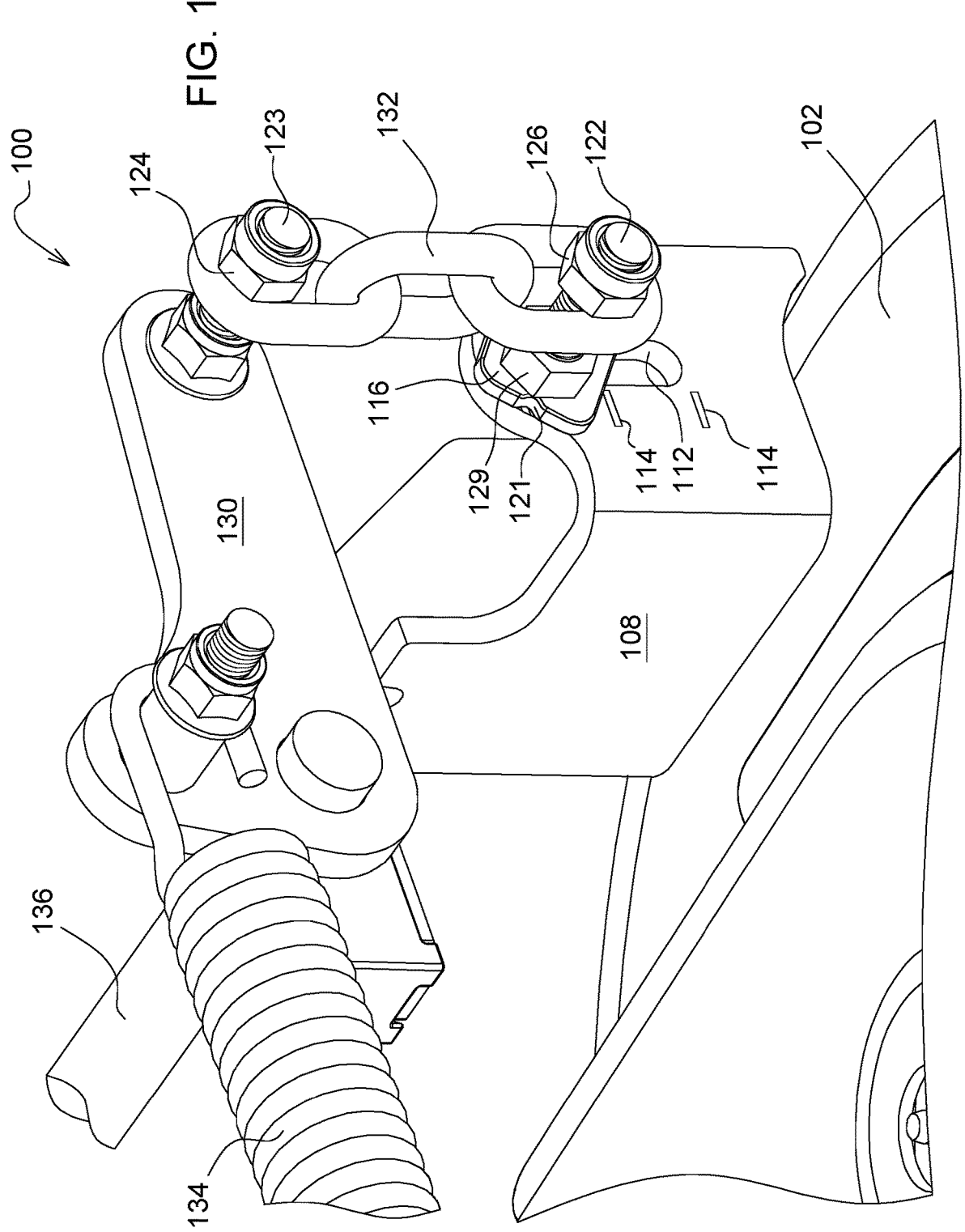
FIG. 1 is a perspective view of a mower deck leveling linkage at a first position according to a first embodiment of the invention.
Figure 2:
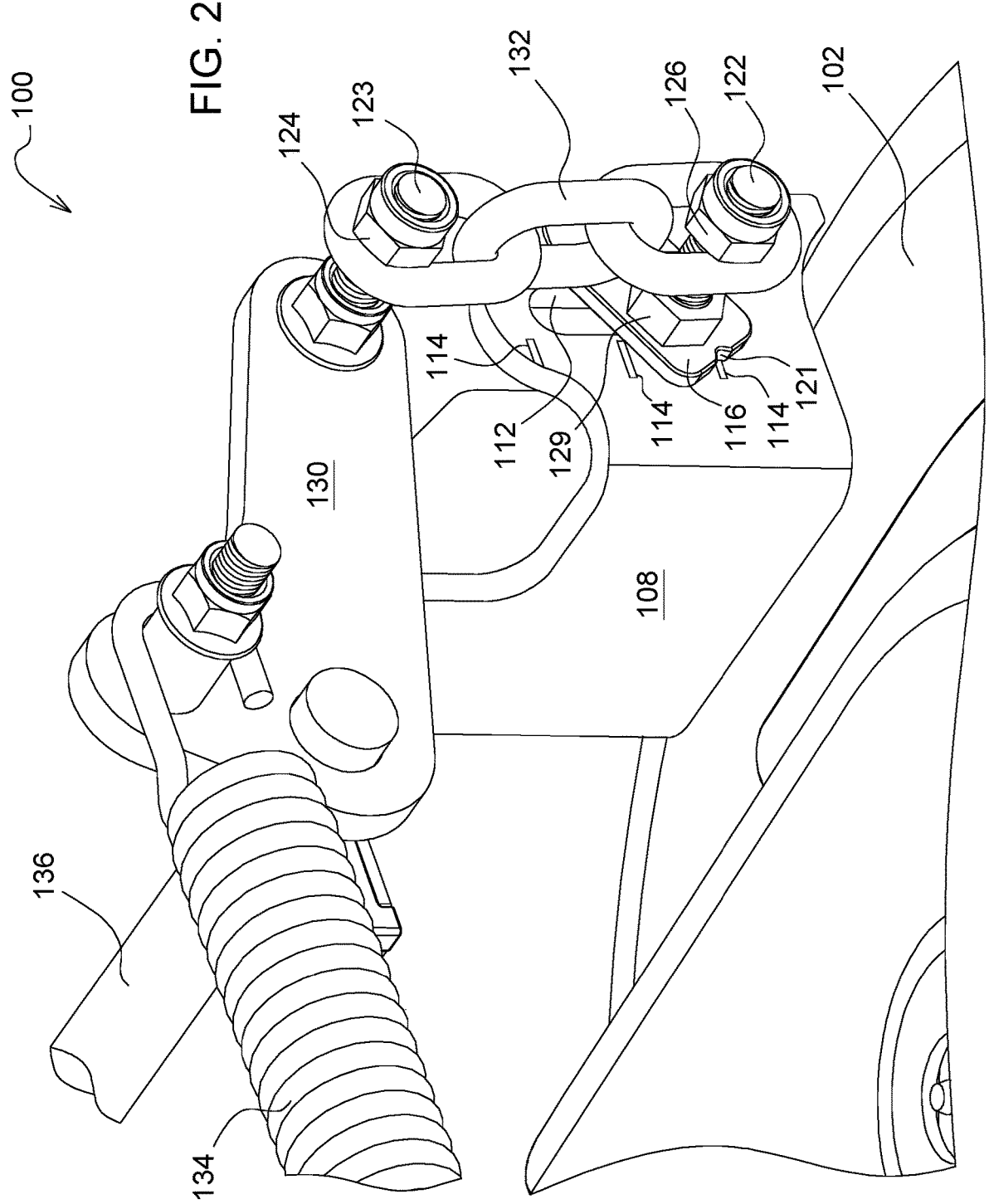
FIG. 2 is a perspective view of a mower deck leveling linkage at a second position according to a first embodiment of the invention.
Figure 3:
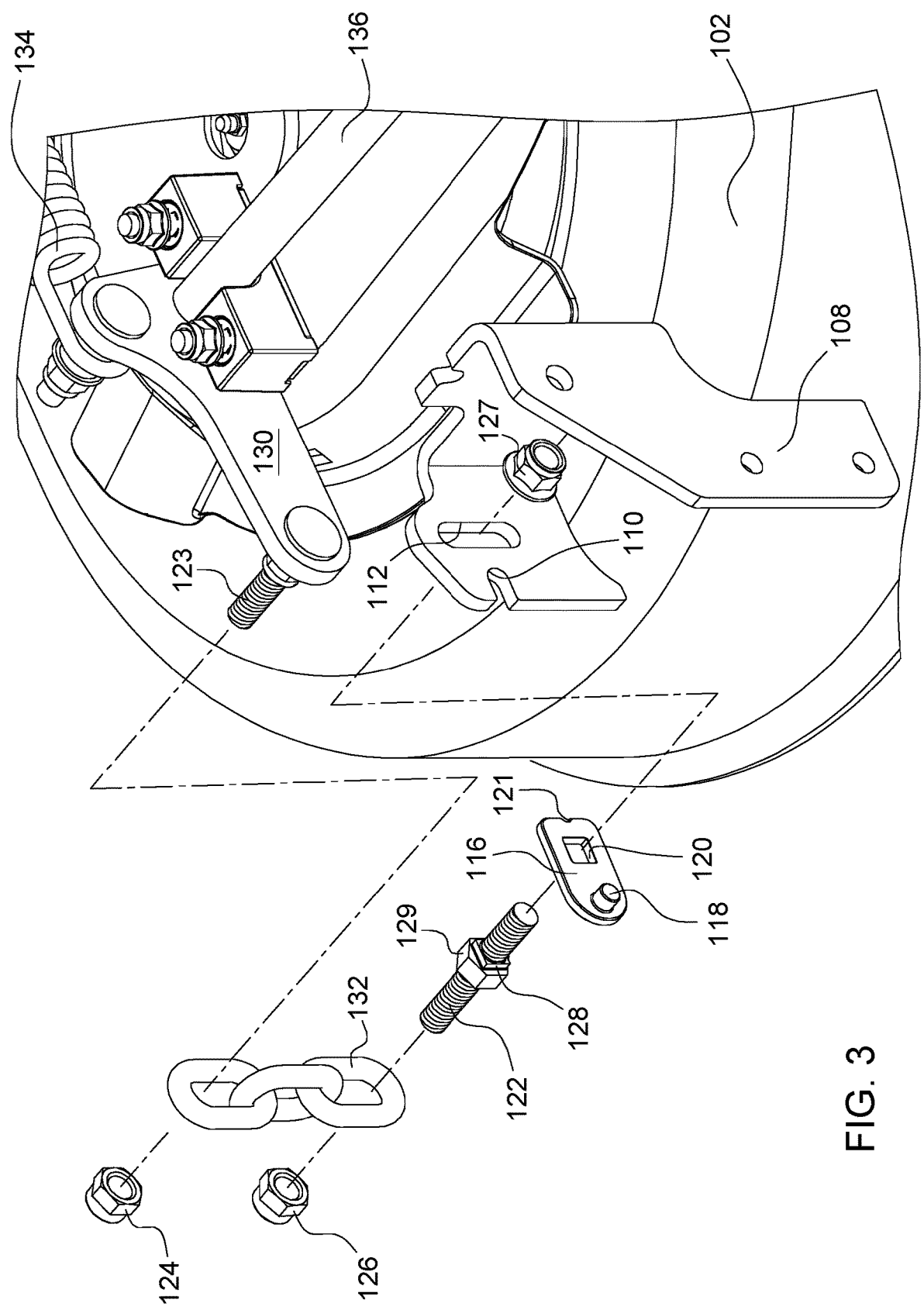
FIG. 3 is an exploded perspective view of a mower deck leveling linkage according to a first embodiment of the invention.

FIGS. 1-3 show one embodiment of mower deck leveling linkage 100 which may be mounted to an outer edge of mower deck 102 on a zero turn mower, lawn and garden tractor, or other vehicle. The mower deck may cover a plurality of rotary mower blades, each blade mounted to the lower end of a spindle. Pulleys on the upper ends of the spindles may be rotated by one or more endless belts or a drive shaft driven by an internal combustion engine or other power source on the vehicle. The mower deck may be raised and lowered to a desired cutting height and the mower deck leveling linkage may be used to level the mower deck, so the tips of each rotary mower blade meet the specification and rake setting. For example, a rake setting may specify the rear blade tip should be ⅛ inch to' inch higher than the front blade tip.

In one embodiment, as shown in FIGS. 1-3, each mower deck leveling linkage 100 may be connected to chain 132 or cable which hangs the deck from threaded fastener 123 and nut 124 extending from L-shaped crank 130 used to raise and lower the deck. Each L-shaped crank may be pivotably mounted to a frame member on either side of the mower, so the mower deck preferably may have four mower deck leveling linkages. A foot pedal or lever may be used to pivot the cranks. The front and rear cranks may be connected together by linkage 138, and the rear cranks may be connected together by cross member 136. Coil spring 134 also may be connected to the linkage to assist in raising the mower deck. The length of each mower deck leveling linkage may be adjusted to independently level each corner or outer edge and adjust the rake of the mower deck.

In one embodiment, as shown in FIGS. 1-3, each mower deck leveling linkage 100 may include hanger bracket 108 or other linkage member welded to a corner or outer edge of the mower deck. Hanger bracket 108 or other linkage member may include horizontal slot 110 and vertical slot 112. Several stamped tick marks 114 also may be provided on the hanger bracket adjacent the vertical slot.

In one embodiment, as shown in FIGS. 1-3, mower deck leveling linkage 100 may include eccentric leveling plate 116 engaged to hanger bracket 108 using inserting threaded fastener 122. The threaded fastener may be inserted through the eccentric leveling plate's opening 120 and the hanger bracket's vertical slot 112. The threaded fastener may have a neck 128 with the same multi-sided perimeter geometry as opening 120 in the eccentric leveling plate. For example, the threaded fastener may have a square neck 128 that fits into and engages a square opening 120 in the eccentric leveling plate. As a result, the threaded fastener may be used to pivot the eccentric leveling plate, but on an axis that is offset from the axis of the threaded fastener. Instead, the eccentric leveling plate pivots on the axis of pin 118 which extends from the face of the leveling plate at an off-center position, preferably offset at least about ½ inch from the axis of the threaded fastener. Pin 118 may extend from the eccentric leveling plate and may be inserted into the hanger bracket's horizontal slot 110. As a result, pivoting the eccentric leveling plate on the axis of pin 118 changes the length of the linkage by raising or lowering a corner or edge of the mower deck.

In one embodiment, as shown in FIGS. 1-3, mower deck leveling linkage 100 may include a method of adjusting the level and/or rake of a mower deck using the following steps. First, loosen nut 126 on the end of threaded fastener 122 to loosen leveling plate 116. Second, grip the hex cross section 129 on the threaded fastener with a wrench or similar tool. The wrench may be used to pivot the eccentric leveling plate on the axis of pin 118 to change the length of the mower deck leveling linkage. As the eccentric leveling plate pivots, the threaded fastener can move up or down in vertical slot 112, and pin 118 can slide along horizontal slot 110. Third, check to see if each blade tip is at the desired level and rake meeting the specification. Tick marks 114 on the deck hanger bracket may be lined up with one of the notches 121 on the leveling plate for use as indicators. Fourth, tighten nut 126 again.

Figure 4:
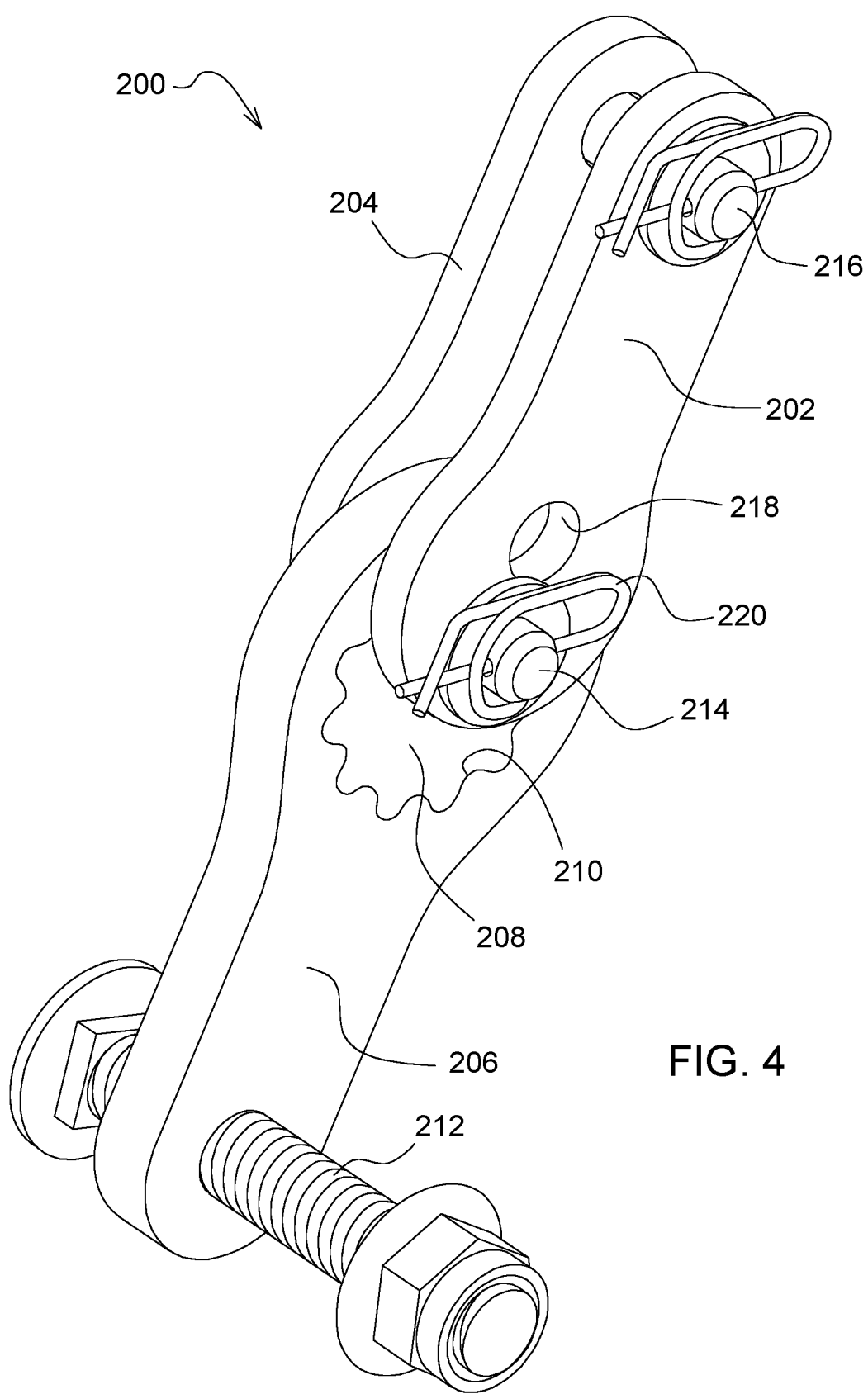
FIG. 4 is a perspective view of a mower deck leveling linkage according to a second embodiment of the invention.

In an alternative embodiment, as shown in FIG. 4, mower deck leveling linkage 200 may include eccentric leveling plate 208 engaged between leveling linkage members 202, 204 and 206. The mower deck leveling linkage may be at each corner or outer edge of the mower deck to level and/or adjust the rake of a mower deck. The eccentric leveling plate may be pivoted and re-oriented at different positions to adjust the length of the linkage. The eccentric leveling plate may have a multi-sided perimeter geometry. The eccentric leveling plate may be connected between a pair of upper linkage members 202, 204 connected to a pivotable crank arm or frame member, and lower linkage member 206 attached to or mounted to the mower deck. The upper linkage member may be connected with pin 216 to the pivotable crank arm or frame member, and the lower linkage member connected with pin 212 to the mower deck. The eccentric leveling plate 208 may have a multi-sided perimeter geometry and may be positioned at any of several different orientations in opening 210 having a corresponding geometry. Pin 214 may be inserted through or extend from the eccentric leveling plate at an off-center position and may be inserted through holes 218 in the upper arms and retained by clip 220.

Having described the preferred embodiment, it will become apparent that various modifications can be made without departing from the scope of the invention as defined in the accompanying claims.

The invention claimed is:

1. A mower deck leveling linkage, comprising:
   an eccentric leveling plate engaged to a bracket on an outer edge of a mower deck;
   a pin extending from an off-center position of the eccentric leveling plate and into a slot in the bracket;
   the eccentric leveling plate being pivotable on the pin by turning a threaded fastener extending through an opening with an axis adjacent the slot to change the level of the mower deck.

2. The mower deck leveling linkage of claim 1 wherein the threaded fastener includes a square neck that engages a square opening in the eccentric leveling plate.

3. The mower deck leveling linkage of claim 2 wherein the threaded fastener includes a hex cross section adjacent the square neck.

* * * * *